(12) United States Patent
Furukawa et al.

(10) Patent No.: US 11,328,337 B2
(45) Date of Patent: May 10, 2022

(54) METHOD AND SYSTEM FOR LEVEL OF DIFFICULTY DETERMINATION USING A SENSOR

(71) Applicant: TOYOTA JIDOSHA KABUSHIKI KAISHA, Toyota (JP)

(72) Inventors: Daisuke Furukawa, Chofu (JP); Toshifumi Nishijima, Kasugai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/919,493

(22) Filed: Jul. 2, 2020

(65) Prior Publication Data

US 2021/0090152 A1    Mar. 25, 2021

(30) Foreign Application Priority Data

Sep. 25, 2019   (JP) .............................. JP2019-174547

(51) Int. Cl.
*G06Q 30/00*   (2012.01)
*G06Q 30/06*   (2012.01)

(52) U.S. Cl.
CPC ..... *G06Q 30/0631* (2013.01); *G06Q 30/0639* (2013.01)

(58) Field of Classification Search
CPC ........................ G06Q 30/0631; G06Q 30/0639
See application file for complete search history.

(56) References Cited

U.S. PATENT DOCUMENTS

| 8,054,180 | B1* | 11/2011 | Scofield | ................ | H04W 4/029 340/539.11 |
| 2012/0303480 | A1* | 11/2012 | Stone | ..................... | G06Q 30/00 705/26.8 |
| 2014/0280546 | A1* | 9/2014 | King | ..................... | H04L 51/24 709/204 |
| 2015/0262249 | A1* | 9/2015 | Wical | ................. | G06Q 30/0257 705/14.55 |
| 2016/0308686 | A1* | 10/2016 | Vijayrao | .............. | H04L 12/2803 |
| 2017/0084274 | A1 | 3/2017 | Kim et al. | | |
| 2018/0293644 | A1* | 10/2018 | Allen | .................. | G06Q 30/0633 |
| 2019/0385213 | A1* | 12/2019 | Pande | ................ | G06Q 30/0631 |

FOREIGN PATENT DOCUMENTS

JP           2017-58673 A        3/2017

OTHER PUBLICATIONS

Donmez, Birsen, Linda Ng Boyle, and John D. Lee. "Safety implications of providing real-time feedback to distracted drivers." Accident Analysis & Prevention 39.3 (2007): 581-590. (Year: 2007).*
Monk, Christopher A., et al. "Recovering from interruptions: Implications for driver distraction research." Human factors 46.4 (2004): 650-663. (Year: 2004).*
Vijay Umapathy, "Add to-dos to your Google Calendar using Reminders", https://blog.google/products/calendar/add-to-dos-to-yourgooglecalendar/, Dec. 7, 2015, 5 pages.

* cited by examiner

*Primary Examiner* — Matthew E Zimmerman
(74) *Attorney, Agent, or Firm* — Oblon, McClelland, Maier & Neustadt, L.L.P.

(57) ABSTRACT

An information processing method includes a step of obtaining article information including a category of an article which a user wishes to purchase, and a step of outputting a reminder concerning purchase of the article, when a reminding condition is satisfied in a reminding period that is set according to the category of the article obtained.

7 Claims, 11 Drawing Sheets

1

METHOD AND SYSTEM FOR LEVEL OF DIFFICULTY DETERMINATION USING A SENSOR

INCORPORATION BY REFERENCE

The disclosure of Japanese Patent Application No. 2019-174547 filed on Sep. 25, 2019 including the specification, drawings and abstract is incorporated herein by reference in its entirety.

BACKGROUND

1. Technical Field

The disclosure relates to a technology for outputting voice to a user.

2. Description of Related Art

In recent years, car navigation systems of dialogue type are in widespread use. A dialogue processing apparatus disclosed in Japanese Unexamined Patent Application Publication No. 2017-58673 (JP 2017-58673 A) extracts a unit of expression that is not understood from a primary speech, and provides a clarifying query associated with the extracted unit of expression, so as to clarify the extracted unit of expression.

SUMMARY

It is recognized that the convenience is enhanced by reminding the user of purchase of an article via a dialogue system. While it becomes unnecessary to remind the user of purchase of the article after the user purchases the article, it takes some time and effort for the user to perform operation to stop reminding. Thus, it is desired to remind the user in an appropriate period, while reducing the time and effort required for operation of the user.

The disclosure provides an information processing method and an information processor, which make it possible to remind the user of purchase of an article in an appropriate period, while reducing the time and effort required for operation of the user.

An information processing method according to a first aspect of the disclosure includes a step of obtaining article information including a category of an article which a user wishes to purchase, and a step of outputting a reminder concerning purchase of the article, when a reminding condition is satisfied in a reminding period that is set according to the category of the article obtained.

An information processor according to a second aspect of the disclosure includes an article information obtaining unit that obtains article information including a category of an article which a user wishes to purchase, and an output unit that outputs a reminder concerning purchase of the article, when a reminding condition is satisfied in a reminding period that is set according to the category of the article obtained.

According to the disclosure, it is possible to remind the user of purchase of the article in an appropriate period, while reducing the time and effort required for operation of the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
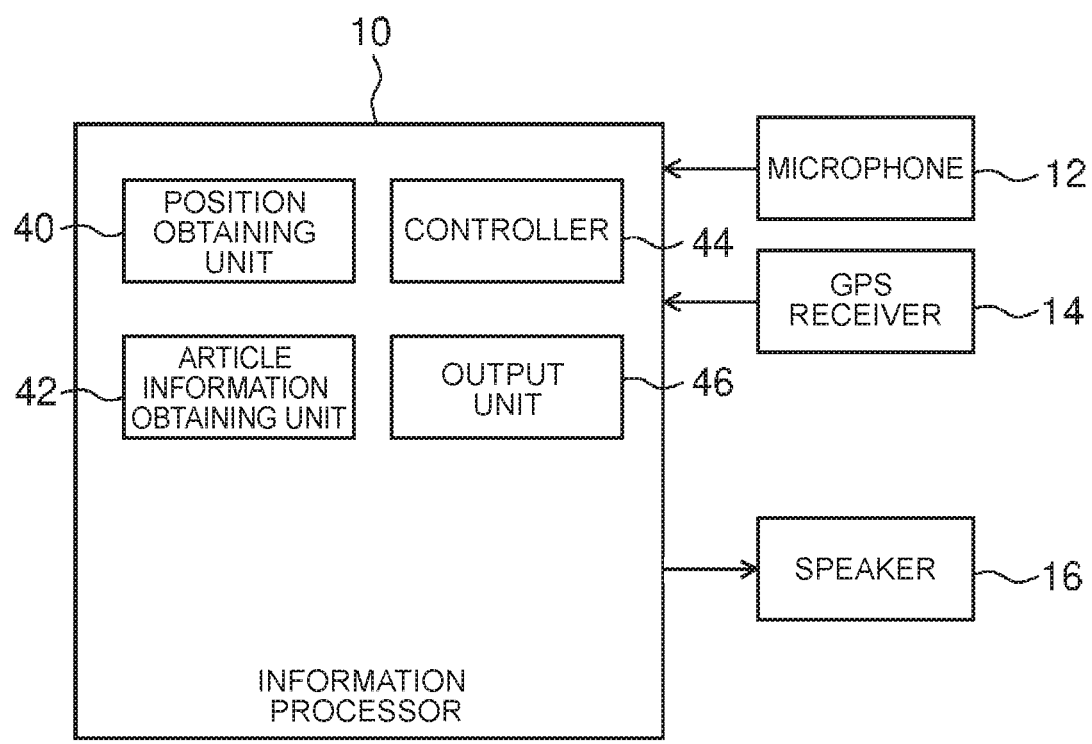
FIG. 1 is a block diagram showing the functional configuration of an information processing system according to a first embodiment.

FIG. 1 is a block diagram showing the functional configuration of an information processing system 1 according to a first embodiment. The information processing system 1 is installed on a vehicle in the form of an automobile. The information processing system 1 may be called "agent" or "dialogue system" that has a dialogue with the user, and outputs a reminder concerning purchase of an article. The information processing system 1 includes an information processor 10, microphone 12, GPS receiver 14, and speaker 16.

The microphone 12 is provided in a vehicle cabin of the own vehicle, and obtains voice in the vehicle cabin. The voice includes speech generated by the driver of the vehicle as the user of the information processing system 1. The microphone 12 outputs voice data thus obtained, to the information processor 10.

The GPS receiver 14 receives signals from GPS (Global Positioning System) satellites, and derives the position of the own vehicle from the signals. The position of the own vehicle is the position of the user who is on board the vehicle. The position of the own vehicle includes longitude and latitude. The GPS receiver 14 outputs position information of the own vehicle to the information processor 10.

The speaker 16 is a voice output device that is provided in the vehicle cabin of the own vehicle, and outputs voice.

The information processor 10 includes a position obtaining unit 40, article information obtaining unit 42, controller 44, and output unit 46.

In the information processor 10, each element described as one of function blocks that perform various operations can be constructed in terms of hardware by a circuit block, memory or other LSI, and is implemented in terms of software by a program loaded into a memory. Thus, it is to be understood by those skilled in the art that these function blocks can be implemented in various forms via only hardware, only software, or a combination thereof, and are not limited to any of these forms.

The position obtaining unit 40 obtains position information of the own vehicle from the GPS receiver 14 on a regular basis. The position information includes longitude and latitude. The position obtaining unit 40 outputs position information to the controller 44.

As one example of usage situation of the information processing system 1, suppose a situation where the user visits a restaurant, an amusement facility, and a drugstore, in this order, by vehicle, on the same day. While the user plans to purchase an article at the drugstore, he/she may forget the plan of purchase itself, or may forget what he/she is going to purchase, if there are two or more plans in one day. Also, when the user plans to purchase two or more articles, it may be difficult for the user to remember all of the articles to be purchased. Thus, the user registers, before his/her departure, the content the user wishes to be reminded of, namely, an article or articles the user wishes to purchase, and a store or stores that sell the article(s), in the information processing system 1. In this example, the articles are carbonated water and energy drink, which are sold at the same drugstore. These articles may be sold at different stores. The number of articles registered may be one, or two or more.

When the user performs operation, such as button operation, to register a reminder, the article information obtaining unit 42 receives a voice signal from the microphone 12, and recognizes voice uttered by the user, based on the voice signal. The result of voice recognition includes text data. The article information obtaining unit 42 obtains information on an article the user wishes to purchase and a store that sells the article, based on the result of voice recognition. The information on the article includes the name of the article. The voice recognition and the operation to obtain information from the result of voice recognition can be performed using known technologies.

The article information obtaining unit 42 holds a database in which the name of each article is associated with the category of the article, and obtains the category of the article by referring to the database. In the database, article names "carbonated water", "energy drink", "gum", and "bread" are respectively associated with an article category "food and drink". Also, article names "plastic model", "game" and "doll" are respectively associated with an article category "toy".

The user says, "Remember to buy carbonated water at the drugstore AA", while operating a button (not shown), for example. Also, the user says, "Remember to buy energy drink at the drugstore AA", while operating the button. With these speeches, the article information obtaining unit 42 obtains "carbonated water" and "energy drink" as article names, obtains "food and drink" as their article category, and obtains "drugstore AA" as the store that sells the articles. The article information obtaining unit 42 supplies the obtained information to the controller 44.

The article information obtaining unit 42 may obtain information on the name of each article, article category, and store that sells the article, based on information entered via a touch panel (not shown). In this case, the store may be designated on a map displayed on a display unit (not shown).

When the controller 44 is supplied with article information, etc. from the article information obtaining unit 42, it supplies a response content indicating that a reminder has been registered, to the output unit 46. The response content is given text data, such as "I'll remember that".

When the response content is supplied from the controller 44 to the output unit 46, the output unit 46 outputs the response content via the speaker 16. More specifically, the output unit 46 converts text data of the response content thus supplied, into a voice signal, and outputs the voice signal to the speaker 16. The speaker 16 outputs the response content with voice, based on the voice signal generated from the output unit 46. The information processing system 1 responds, "I'll remember that", to the user's speech, "Remember to buy carbonated water at the drugstore AA", so that the user can grasp that the reminder has been registered. When the article information obtaining unit 42 cannot obtain the article name, etc., because the speech is not appropriate or unclear, the information processing system 1 does not respond to the speech; therefore, the user can grasp that the registration failed, and makes the speech again so as to register the reminder. The output unit 46 may display a character on a display unit (not shown). In this case, the output unit 46 may provide animation display in which the character generates voice as if it has a dialogue with the user.

The controller 44 creates a reminder concerning purchase of an article, based on information on the article and a store that sells the article, which information is supplied from the article information obtaining unit 42. The reminder is text data representing a content; "You said you would buy XX (article name) at YY (store), didn't you?", for example. The reminder may include the names of two or more articles.

When a predetermined reminding condition is satisfied in a reminding period that is set according to the category of the article, the controller 44 supplies data of the reminder created, to the output unit 46.

The food or drink is supposed to be purchased in a short period of about one day from reminder registration, and no reminder is needed two days after the registration. Thus, the reminding period for the article category "food and drink" is, for example, 24 hours.

Toys for presents, accessories, etc. are supposed to require a longer period than articles in the "food and drink" category, from reminder registration to purchase. For example, a situation is envisaged where the user decides to give a toy to a child on his/her birthday that comes several weeks later, but does not purchase it immediately. Thus, the reminding period for the article categories "toy", "accessory" is longer than that of the category "food and drink", and may be three weeks, for example. Articles other than those of the category "food and drink", which are not limited to "toy", may require a longer period from reminder registration to purchase, than those of the category "food and drink"; therefore, the reminding periods for article categories other than "food and drink" may be set to be longer than the reminding period for the "food and drink". The reminding period may be set as appropriate by experiment, or the like.

The reminding condition is that the position of the user supplied from the position obtaining unit 40 is within a predetermined distance from the store that sells the article concerned. The position of the store is specified by latitude and longitude, based on map data stored in the controller 44. The map data may be supplied from a car navigation system (not shown) installed on the vehicle, or may be supplied from an external server via wireless communications. The predetermined distance may be within a range from ten meters to a hundred meters, and may be set as appropriate by experiment, or the like.

When data of the reminder is supplied from the controller 44 to the output unit 46, namely, when the reminding condition is satisfied in the reminding period, the output unit 46 outputs the reminder thus supplied, via the speaker 16. In the reminding period, the reminder is generated each time the reminding condition is newly satisfied.

Suppose the user moves to the restaurant by vehicle, have lunch at the restaurant, and then moves to the amusement facility. The user, who enjoyed himself/herself at the amusement facility, leaves the amusement facility, and travels near the drugstore AA on his/her way home, in a condition where the user forgets to do shopping at the drugstore AA.

Figure 2:
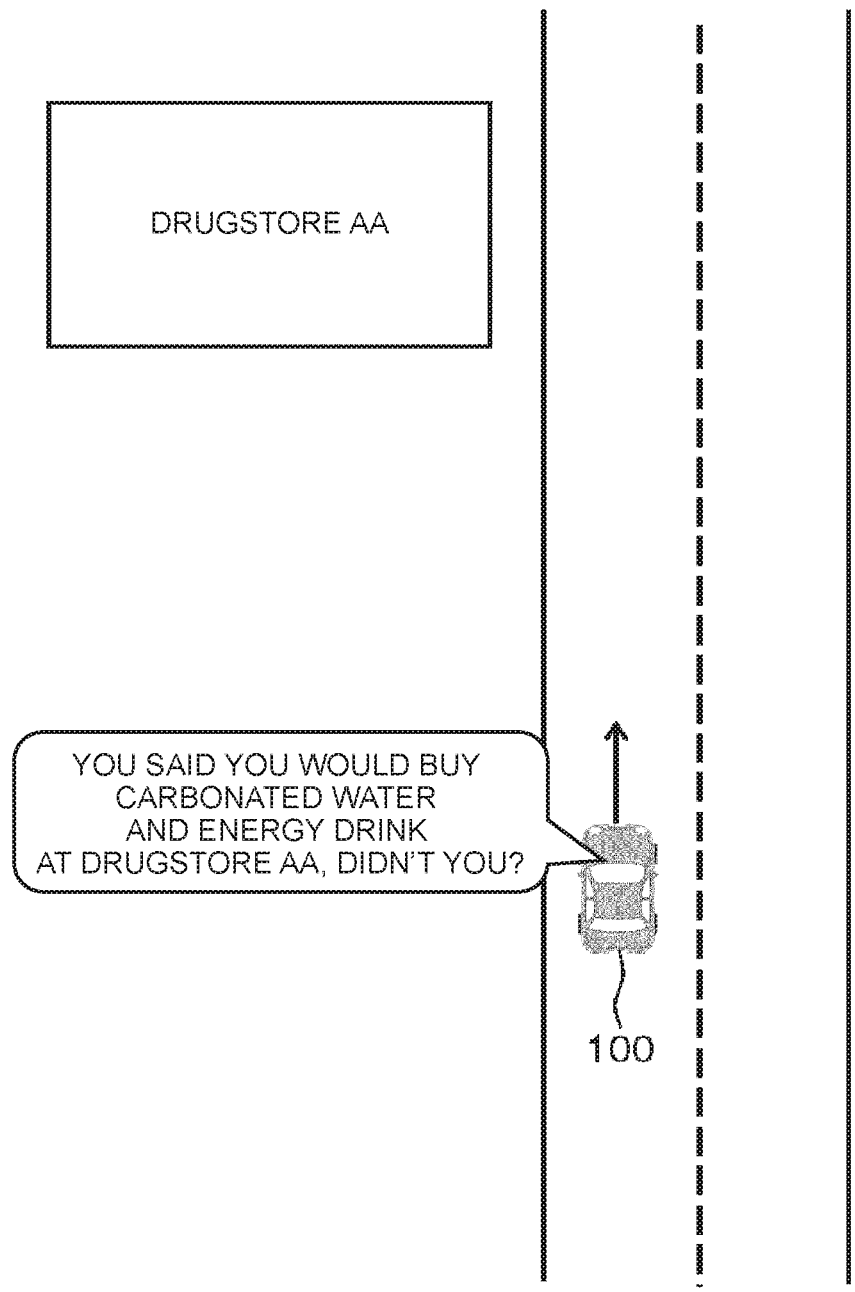
FIG. 2 is a view showing a situation where a vehicle on which the information processing system of FIG. 1 is installed is traveling near a drugstore AA.

FIG. 2 shows a situation where the vehicle 100 on which the information processing system 1 of FIG. 1 is installed travels near the drugstore AA. The reminding condition is satisfied in the reminding period, at the position of FIG. 2, and the information processing system 1 utters a reminder; "You said you would buy carbonated water and energy drink at the drugstore AA, didn't you?". As a result, the user of the vehicle 100 is reminded of the articles to be purchased at the drugstore AA, and can move to the drugstore AA for shopping.

When the reminding period has passed, the controller 44 does not supply data of the reminder to the output unit 46 even if the reminding condition is satisfied. When the data of the reminder is not supplied from the controller 44 to the output unit 46, the output unit 46 does not output the reminder. Thus, when the reminding period has passed, the output unit 46 does not output the reminder even if the reminding condition is satisfied.

On the day after the user purchased carbonated water, etc., even when the user travels near the drugstore AA by vehicle, the information processing system 1 does not output the reminder if 24 hours has passed from registration of the reminder. Thus, unnecessary reminders can be reduced or prevented. As a result, the user is less likely or unlikely to be bothered by unnecessary reminders. The user does not need to perform operation to stop output of the reminder when the reminder becomes unnecessary; thus, the time and effort required for the operation can be reduced or eliminated.

As another example of usage situation of the information processing system 1, suppose the user decides to give a plastic model to a child on his/her birthday that comes two weeks later, but does not purchase it immediately. The user says to the microphone, "Remember to buy a plastic model at the toy store BB." In response to this speech, the information processing system 1 speaks, "I'll remember that."

Even when the user forgets to purchase the present, after a lapse of about one week from reminder registration, the information processing system 1 speaks, as a reminder, "You said you would buy a plastic model at the toy store BB, didn't you?", when the vehicle of the user travels in the vicinity of the toy store BB. As a result, the user is reminded of purchase of the present, and can purchase it at a desired time. Since the reminder can be provided in a longer period than that in the case of the food and drink, the user can be easily and reliably reminded of purchase of the article that is not purchased soon.

After a lapse of three weeks from registration, the information processing system 1 does not utter the reminder, even when the user on board the vehicle passes by the toy store BB. Thus, the user is less likely or unlikely to be bothered by the reminder.

The reminding condition may be that the position of the user is within the predetermined distance from the store, and the ignition switch is in the OFF position. In this case, it is assumed that the user remembers to go to the store but forgets what he/she is going to purchase, and parks the vehicle at around the store. The user is not performing driving operation, and is thus able to easily hear the reminder.

The reminding condition may be that the position of the user is within the predetermined distance from the store, or a predetermined period that is set according to the category of the article has elapsed from reminder registration. The predetermined period is shorter than the reminding period, and may be set as appropriate by experiment, or the like. When the category of the article is "food and drink", the predetermined period may be six hours, for example. When the category of the article is "toy" or "accessory", the predetermined period may be 10 days, for example. Thus, the user can be reminded even when the user did not go to the vicinity of the store in the reminding period.

Figure 3:
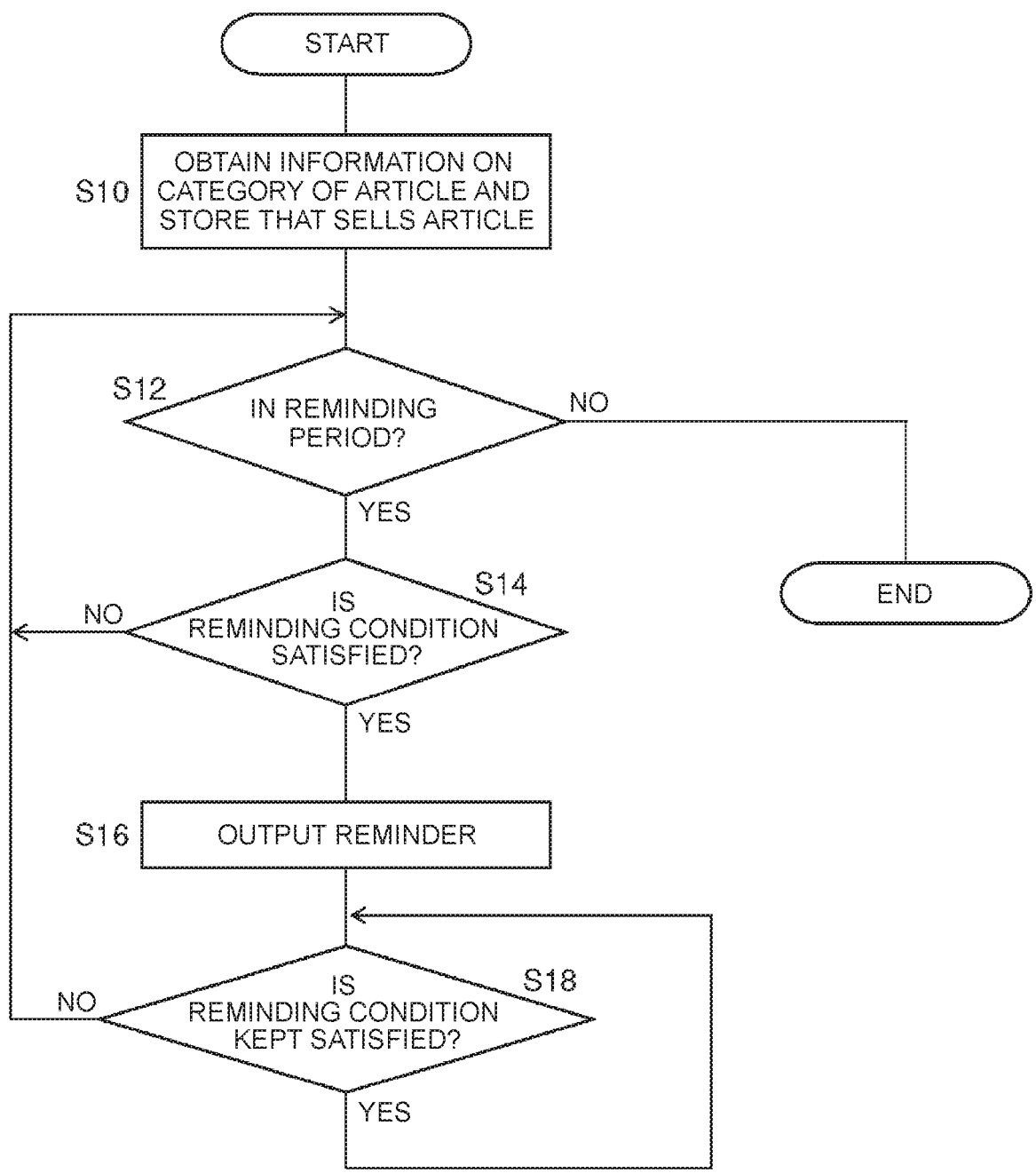
FIG. 3 is a flowchart illustrating a control routine of an information processor of FIG. 1.

Next, the overall operation of the information processing system 1 configured as described above will be described. FIG. 3 is a flowchart illustrating a control routine of the information processor 10 of FIG. 1. The control routine of FIG. 3 is performed when the user performs button operation for reminder registration.

The article information obtaining unit 42 obtains information on a category of an article for which a reminder is registered, and a store that sells the article (step S10). When the current time is within the reminding period (YES in step S12), and the reminding condition is satisfied (YES in step S14), the output unit 46 outputs the reminder (step S16). When the reminding condition is not kept satisfied (NO in step S18), the control returns to step S12. When the reminding condition is kept satisfied (YES in step S18), the control returns to step S18. When the current time is not within the reminding period in step S12 (NO in step S12), the control ends. When the reminding condition is not satisfied in step S14 (NO in step S14), the control returns to step S12.

According to this embodiment, the reminder is generated when the reminding condition is satisfied in the reminding period that is set according to the category of the article concerned. Thus, it is possible to remind the user of purchase of the article within a period appropriate for each category of article, while reducing the time and effort required for operation of the user. If the user is reminded when the reminding condition is satisfied in a fixed period with no regard to the category of the article, unlike this embodiment, the user may be reminded after purchase of the article, or reminding may be stopped at the time when the user wishes to be reminded, resulting in insufficient reminding. These situations can be improved according to this embodiment.

Second Embodiment

In a second embodiment, when there is a possibility that the article was purchased at the store in the reminding period, a new reminder is not generated, unlike the first embodiment. In the following, differences from the first embodiment will be mainly described.

The configuration of the information processing system 1 is identical with that of FIG. 1. When the position of the user is within a predetermined distance from the store, for a predetermined time or longer, the controller 44 does not supply data of a reminder to the output unit 46 even if the reminding condition is satisfied again in the reminding period. In this case, the output unit 46 does not output the reminder. The predetermined time is, for example, about 10 min., and may be set as appropriate by experiment, or the like. When the position of the user is within the predetermined distance from the store, for the predetermined time or longer, there is a possibility that the user parked his/her vehicle near the store, and purchased the article at the store.

Thus, in the reminding period, a new reminder is prevented from being generated when there is a possibility that the article was purchased at the store, and the user is less likely or unlikely to be bothered by unnecessary reminding. Also, in the case where the user did not stop at the store even if the reminder was generated, another reminder is generated if the reminding condition is satisfied again in the reminding period; thus, the user is made more likely to purchase the article.

Figure 4:
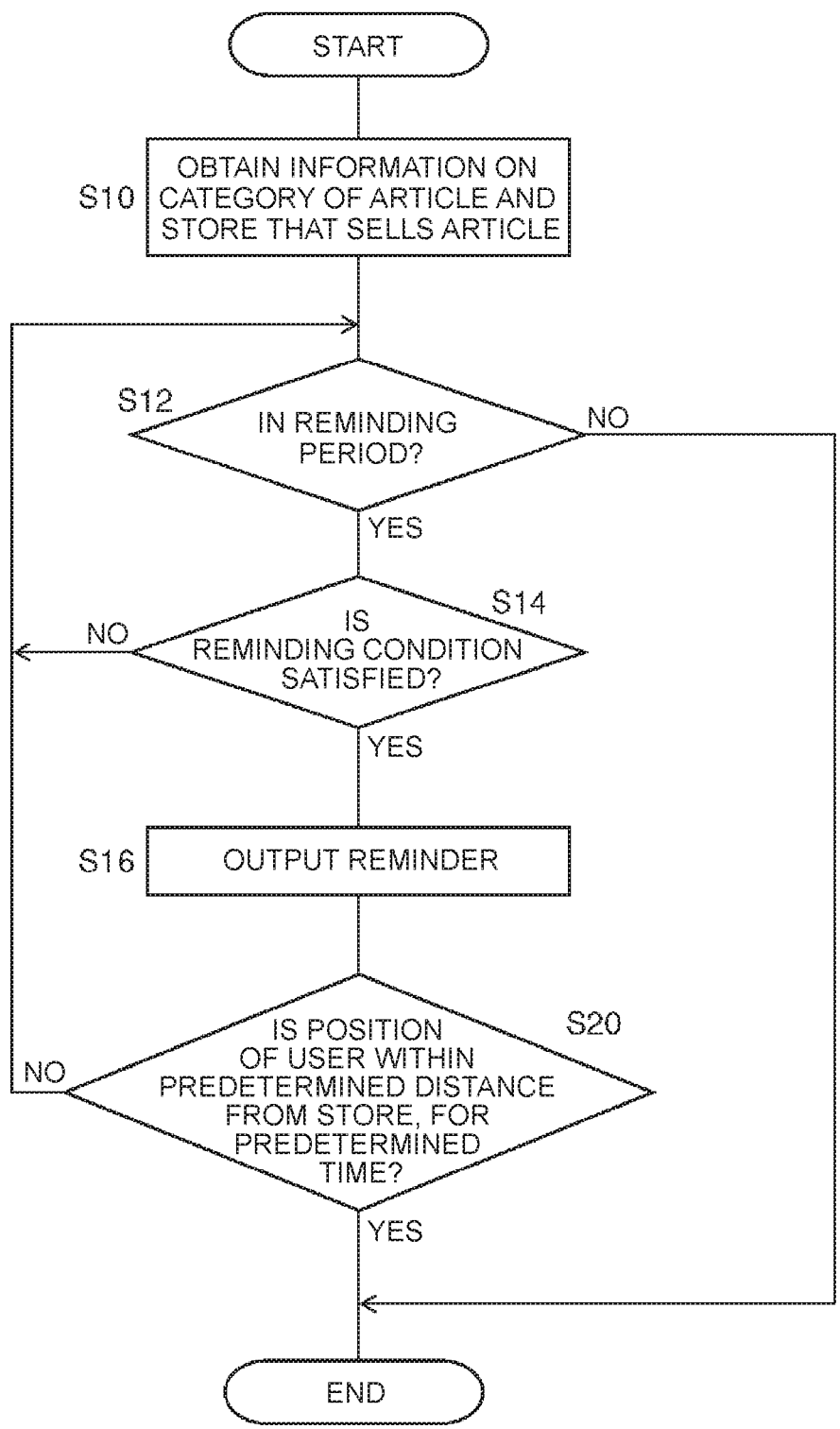
FIG. 4 is a flowchart illustrating a control routine of an information processor according to a second embodiment.

FIG. 4 is a flowchart illustrating a control routine of the information processor 10 according to the second embodiment. In FIG. 4, step S20 is executed in place of step S18 of FIG. 3. When the position of the user is not within the predetermined distance from the store for the predetermined time, after the output unit 46 outputs the reminder in step S16 (NO in step S20), the control returns to step S2. When the position of the user is within the predetermined distance from the store for the predetermined time (YES in step S20), the control ends.

Third Embodiment

In a dialogue system, when a certain query is generated to the user, and there is no response of the user to the query, the query is supposed to be generated again. However, since there is a possibility that the user consciously ignored the query, the user may be bothered or annoyed if the query is always made again. Therefore, it is desirable to make the query again when there is a high necessity in it.

Thus, in a third embodiment, when the user's response to a query is not obtained, whether to permit the query to be generated again is controlled, according to a level of difficulty in response of the user when the query was generated. In the following, differences from the first embodiment will be mainly described.

Figure 5:
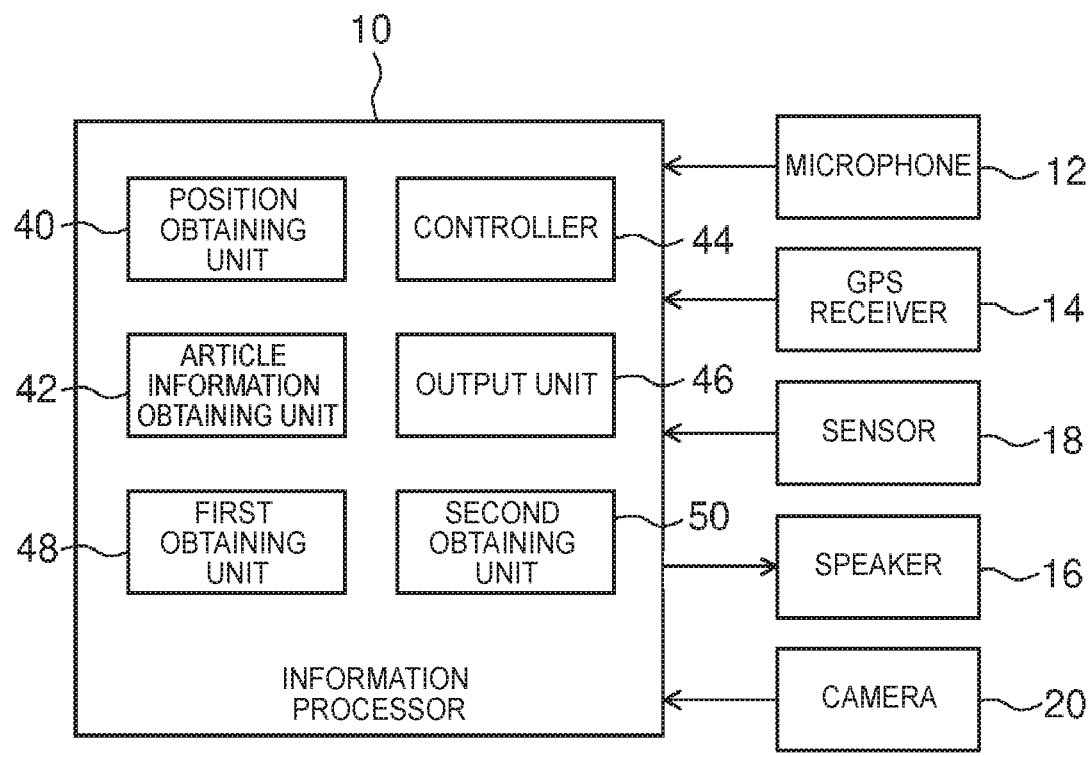
FIG. 5 is a block diagram showing the functional configuration of an information processing system according to a third embodiment.

FIG. 5 is a block diagram showing the functional configuration of an information processing system 1 according to the third embodiment. The information processing system 1 includes an information processor 10, microphone 12, GPS receiver 14, speaker 16, sensor 18, and camera 20.

The sensor 18 detects various kinds of vehicle information of the own vehicle. The vehicle information includes the vehicle speed, acceleration, accelerator operation amount, brake operation amount, steering angle, information as to whether the ignition switch is in the ON position or OFF position. The sensor 18 outputs the detected vehicle information to the information processor 10.

The camera 20 is placed in the vehicle cabin of the own vehicle, and captures an image of the upper body of the driver. The camera 20 outputs the image thus captured, to the information processor 10.

The information processor 10 includes a position obtaining unit 40, article information obtaining unit 42, first obtaining unit 48, second obtaining unit 50, controller 44, and output unit 46.

Unlike the first embodiment, the controller 44 does not use the reminding period set according to the category of the article concerned. Namely, when a predetermined reminding condition is satisfied, the controller 44 supplies data of the reminder created, to the output unit 46, and causes the output unit 46 to output the reminder.

After the information processing system 1 utters the reminder; "You said you would buy carbonated water and energy drink at the drugstore AA, didn't you?", in the situation of FIG. 2, as in the first embodiment, it is assumed that the user parks the vehicle in a parking lot of the drugstore AA, turns off the ignition switch, gets off the vehicle 100, and purchases the articles. Then, the user returns to the vehicle 100, and turns on the ignition switch.

When the controller 44 supplies data of the reminder to the output unit 46, and the ignition switch is turned from OFF to ON, the controller 44 supplies a query to the user, to the output unit 46. The query to the user is a confirmation of the reminder, and may be in the form of text data; "Did you buy XX (article name)?", for example. When the query to the user is supplied from the controller 44 to the output unit 46, the output unit 46 outputs the query to the user, via the speaker 16.

Figure 6:
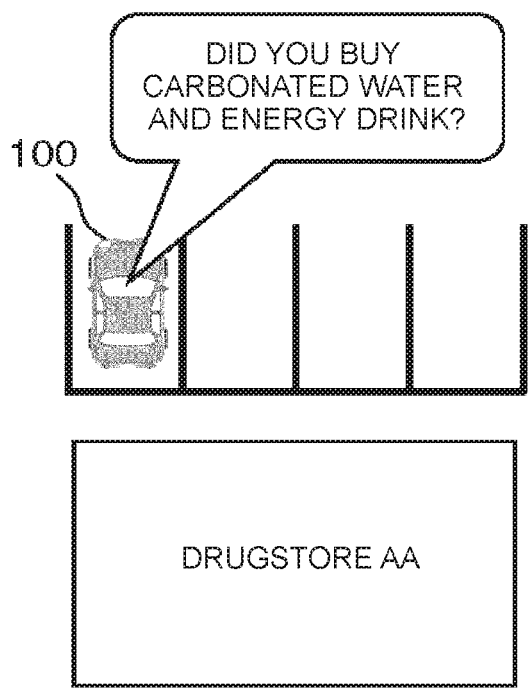
FIG. 6 is a view showing a situation where a vehicle on which the information processing system of FIG. 5 is installed is parked in a parking lot of the drugstore AA.

FIG. 6 shows a situation where the vehicle 100 on which the information processing system 1 of FIG. 5 is installed is parked in the parking lot of the drugstore AA. FIG. 6 shows the situation that follows that of FIG. 2. When the user, who has returned to the vehicle 100, turns on the ignition switch, the information processing system 1 utters a query; "Did you buy carbonated water and energy drink?"

When the output unit 46 outputs the query to the user, and the user performs voice recognition operation, such as button operation, the first obtaining unit 48 receives voice signal from the microphone 12, during a predetermined voice recognition period, and recognizes voice uttered by the user, based on the voice signal. When the output unit 46 outputs the query to the user, the first obtaining unit 48 may receive voice signal from the microphone 12, during a predetermined voice recognition period, without using the presence or absence of voice recognition operation. The first obtaining unit 48 obtains a response of the user to the query thus generated, based on the result of voice recognition.

The response of the user is supposed to be like "I bought them", or "I haven't bought them." The case where there is no response of the user is also envisaged.

When the first obtaining unit 48 obtains the response of the user, "I bought them", the controller 44 supplies text data, "Good!", to the output unit 46, causes the output unit 46 to generate the voice data, and inhibits the output unit 46 from outputting the query and the reminder again. Thus, the user can be prevented from being bothered by unnecessary reminder and query.

When the first obtaining unit 48 obtains the response of the user. "I haven't bought them", the controller 44 supplies text data, "Are you all right?", to the output unit 46, causes the output unit 46 to generate the voice data, and permits the output unit 46 to output the query and the reminder again. Thus, when the vehicle approaches the store selling the articles again, the controller 44 outputs the reminder and the query again, so as to make the user more likely to purchase the articles.

The second obtaining unit 50 obtains vehicle information at the time when the query was generated from the output unit 46 to the user, from the sensor 18, and specifies the traveling state of the vehicle when the query was generated from the output unit 46 to the user, based on the vehicle information thus obtained.

The second obtaining unit 50 obtains an image of the driver at the time when the query was generated from the output unit 46 to the user, from the camera 20, and specifies the behavior of the user at the time when the query was generated from the output unit 46 to the user, based on the image thus obtained.

The second obtaining unit 50 obtains the voice signal at the time when the query was generated from the output unit 46 to the user, from the microphone 12, and specifies an in-cabin environment at the time when the query was generated from the output unit 46 to the user, based on the voice signal thus obtained.

The second obtaining unit 50 obtains the level of difficulty in response of the user when the query was generated from the output unit 46, based on the traveling state of the vehicle, behavior of the user, or in-cabin environment of the vehicle at the time when the query was generated from the output unit 46 to the user.

When the traveling state of the vehicle is a high-speed traveling state, accelerating state, braking state, or steering state, for example, the driver, who is concentrating on vehicle driving operation, may have a difficulty in responding to the query; thus, the level of difficulty in response is equal to or higher than a predetermined second reference value.

When the behavior of the driver is a look-around behavior, for example, the driver may be looking for something, or may get lost. In this case, it may be difficult for the driver to respond to the query, and thus the level of difficulty in response is equal to or higher than the second reference value.

When the in-cabin environment of the vehicle is such that noise, audio output, or the like, is generated at a relatively large volume, it may be difficult for the driver to correctly hear the query generated; therefore, the level of difficulty in response is equal to or higher than the second reference value.

When the first obtaining unit 48 obtains no response of the user, the controller 44 controls whether to permit the output unit 46 to generate the query and the reminder again, according to the level of difficulty in response of the user. When the response of the user is not obtained, and the level of difficulty in response is equal to or higher than the second reference value, the controller 44 permits the output unit 46 to generate the query and the reminder again. This is because, in this case, there is a high probability that the user was not able to respond to the query.

When the response of the user is not obtained, and the level of difficulty in response is lower than the second reference value, the controller 44 inhibits the output unit 46 from generating the query and the reminder again. This is because, in this case, there is a high possibility that the user ignored the query.

In the above manner, the controller 44 permits the query to be made again when it is highly necessary to do it, and inhibits the query from being made again when the necessity is low.

When the response of the user is not obtained, the controller 44 may supply text data, "Are you all right?", to the output unit 46, with no regard to the difficulty in response, and may cause the output unit 46 to output voice representing this content.

Also, the controller 44 supplies a query other than confirmation of a reminder, for example, a query, such as "What is tomorrow's weather, do you know?" or "What day is today, do you know?", as a part of a chat or idle conversation, to the output unit 46, in certain timing, and causes the output unit 46 to output the query. When a response of the user to the query is obtained, the controller 44 creates data of speech based on the content of the response, and causes the output unit 46 to output the speech, while permitting re-output of the query. When no response of the user to the query is obtained, the controller 44 permits re-output of the query, if the level of difficulty in response is equal to or higher than the second reference value. When no response of the user is obtained, the controller 44 inhibits the query from being generated again, if the level of difficulty in response is lower than the second reference value. The controller 44 determines, for each query, whether re-output is permitted. When the user is reluctant to answer the query; "What is tomorrow's weather, do you know?", and ignores the query, this query will not be generated again, and the user is less likely or unlikely to be bothered by the query.

Figure 7:
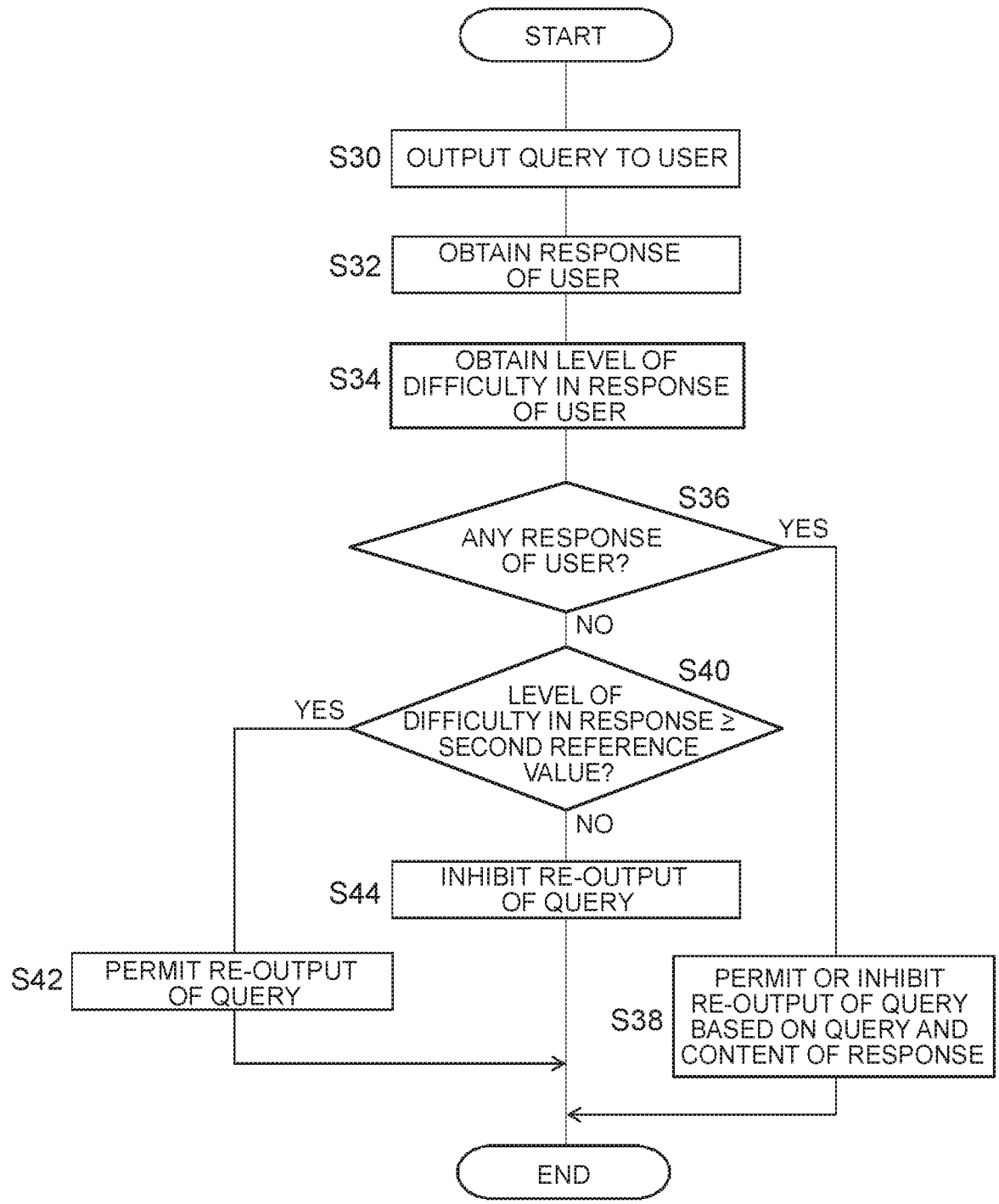
FIG. 7 is a flowchart illustrating a control routine of an information processor of FIG. 5.

Next, the overall operation of the information processing system 1 configured as described above will be described. FIG. 7 is a flowchart illustrating a control routine of the information processor 10 of FIG. 5. The control routine of FIG. 7 is executed when the controller 44 supplies a query to the output unit 46.

The output unit 46 outputs a query to the user (step S30), and the first obtaining unit 48 obtains a response of the user (step S32), while the second obtaining unit 50 obtains the level of difficulty in response of the user when the query was generated (step S34). When there is a response of the user (YES in step S36), the controller 44 permits or inhibits re-output of the query, based on the query and the content of the response (step S38), and finishes this cycle of the routine.

When there is no response of the user (NO in step S36), the controller 44 permits re-output of the query (step S42) if the level of difficulty in response is equal to or higher than the second reference value (YES in step S40), and finishes this cycle of the routine. If the level of difficulty in response is not equal to nor higher than the second reference value (NO in step S40), the controller 44 inhibits re-output of the query (step S44), and finishes this cycle of the routine.

Fourth Embodiment

In a fourth embodiment, when no response of the user to the query is obtained, whether re-output of the query is permitted is controlled according to the level of importance of the query, in place of the level of difficulty in response, unlike the third embodiment. In the following, differences from the third embodiment will be mainly described.

Although not illustrated in the drawings, the information processing system 1 may not include the sensor and camera of FIG. 5. The information processing system 1 obtains the user's birthday, and utters words for celebrating the birthday, in addition to the speech of the third embodiment. The controller 44 supplies data of a query about the birthday to the user, to the output unit 46, each time a predetermined period, such as three weeks, elapses, for example, and causes the output unit 46 to output voice representing the query about the birthday. The query about the birthday, which is made to the user, is "Would you tell me your birthday?", for example. When the user speaks his/her birthday, in response to the query about the birthday, the first obtaining unit 48 obtains the birthday.

When the birthday is obtained, the controller 44 holds the birthday thus obtained, and keeps the output unit 46 from making the query about the birthday. When the current date approaches the birthday thus obtained, the controller 44 supplies text data, such as "Your birthday is coming soon. Happy Birthday," for celebrating the birthday, to the output unit 46, and causes the output unit 46 to output voice indicating this content.

The second obtaining unit 50 holds a database including the level of importance of each query. For example, the level of importance of the query about the birthday to the user is equal to or higher than a predetermined first reference value. The level of importance of a confirmation of a reminder, such as "Did you buy XX (article name)?", and the level of importance of a query as a part of a chat, such as "What is tomorrow's weather, do you know?", is lower than the first reference value. The second obtaining unit 50 obtains the level of importance of the query concerned, based on data of the query supplied from the controller 44, and supplies the level of importance thus obtained, to the controller 44.

When no response of the user to the query generated is obtained by the first obtaining unit 48, the controller 44 permits re-output of the query by the output unit 46 if the level of importance of the query is equal to or higher than the first reference value. Thus, the query about the birthday is repeatedly made until the birthday of the user is obtained. It is desirable to make the query again, because service of speech for celebrating the birthday cannot be provided if no response to the query about the birthday is obtained. This makes it easier to obtain a response of the user to a relatively important query.

When no response of the user to the query generated is obtained by the first obtaining unit 48, the controller 44 inhibits the output unit 46 from outputting the query again if the level of importance of the query is lower than the first reference value. As a result, the user is less likely or unlikely to be bothered or annoyed by the query.

Thus, the query can be made again when it is highly necessary to do it, and the query can be inhibited from being made again when the necessity is low.

Figure 8:
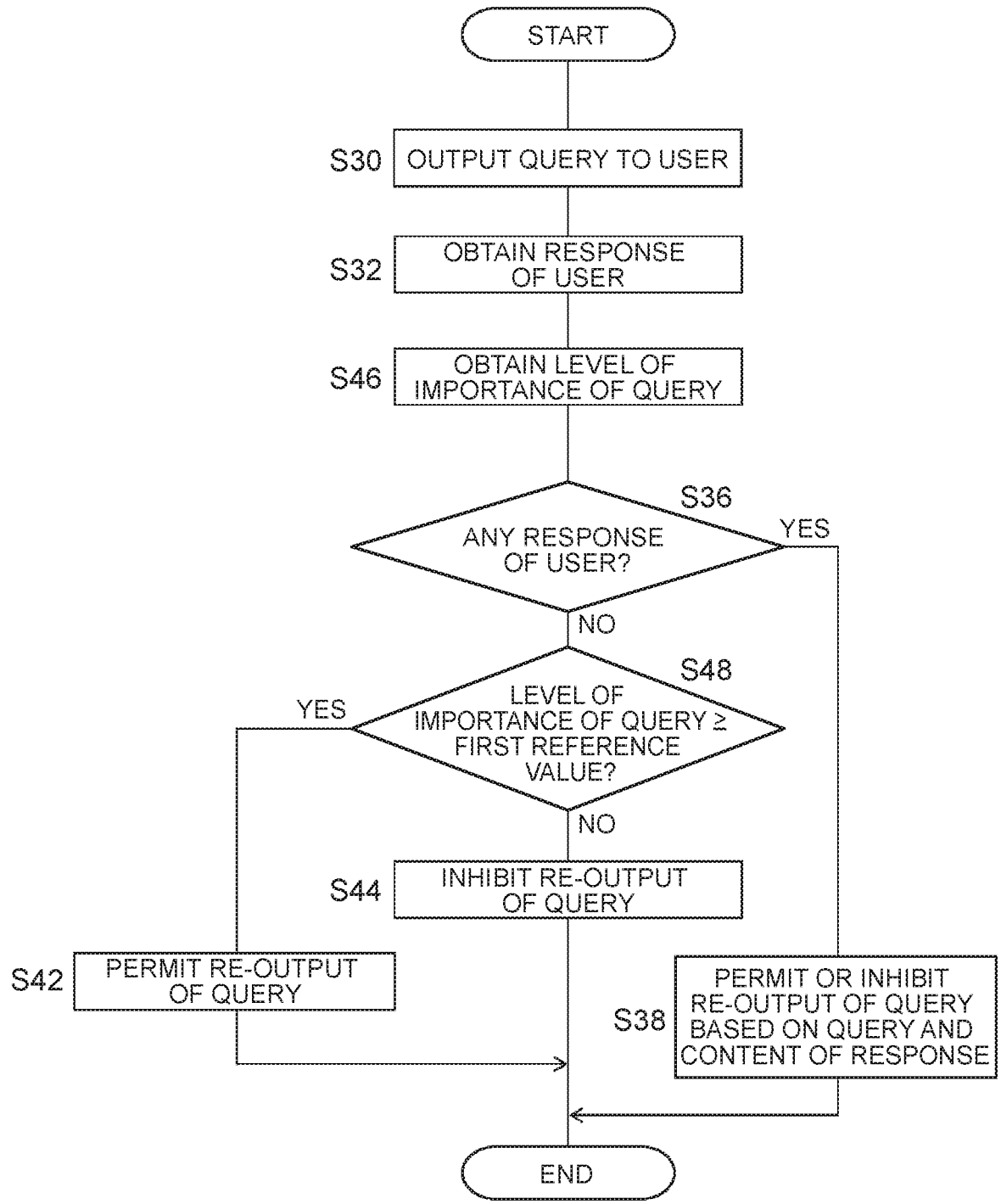
FIG. 8 is a flowchart illustrating a control routine of an information processor according to a fourth embodiment.

FIG. 8 is a flowchart illustrating a control routine of the information processor 10 according to the fourth embodiment. Steps S30, S32 are identical with those of FIG. 7. After execution of step S32, the second obtaining unit 50 obtains the level of importance of the query (step S46). The following steps S36, S38 are identical with those of FIG. 7. When there is no response of the user in step S36 (NO in step S36), and the level of importance of the query is equal to or higher than the first reference value (YES in step S48), step S42 that is identical with that of FIG. 7 is executed. When the level of importance of the query is not equal to nor higher than the first reference value (NO in step S48), step S44 that is identical with that of FIG. 7 is executed.

Fifth Embodiment

In a fifth embodiment, when no response of the user to the query is obtained, whether re-output of the query is permitted is controlled according to the level of difficulty in response of the user and the level of importance of the query, unlike the third embodiment. In the following, differences from the third embodiment will be mainly described.

The configuration of the information processing system 1 is identical with that of FIG. 5. When no response is obtained, the controller 44 permits re-output of the query by the output unit 46, if the level of importance of the query is equal to or higher than the first reference value. When no response is obtained, the controller 44 permits re-output of the query by the output unit 46, if the level of importance of the query is lower than the first reference value, and the level of difficulty in response is equal to or higher than the second reference value. When no response is obtained, the controller 44 inhibits the output unit 46 from outputting the query again, if the level of importance of the query is lower than the first reference value, and the level of difficulty in response is lower than the second reference value.

Thus, the query can be made again when it is highly necessary to do it, and the query can be inhibited from being made again when the necessity is low.

Figure 9:
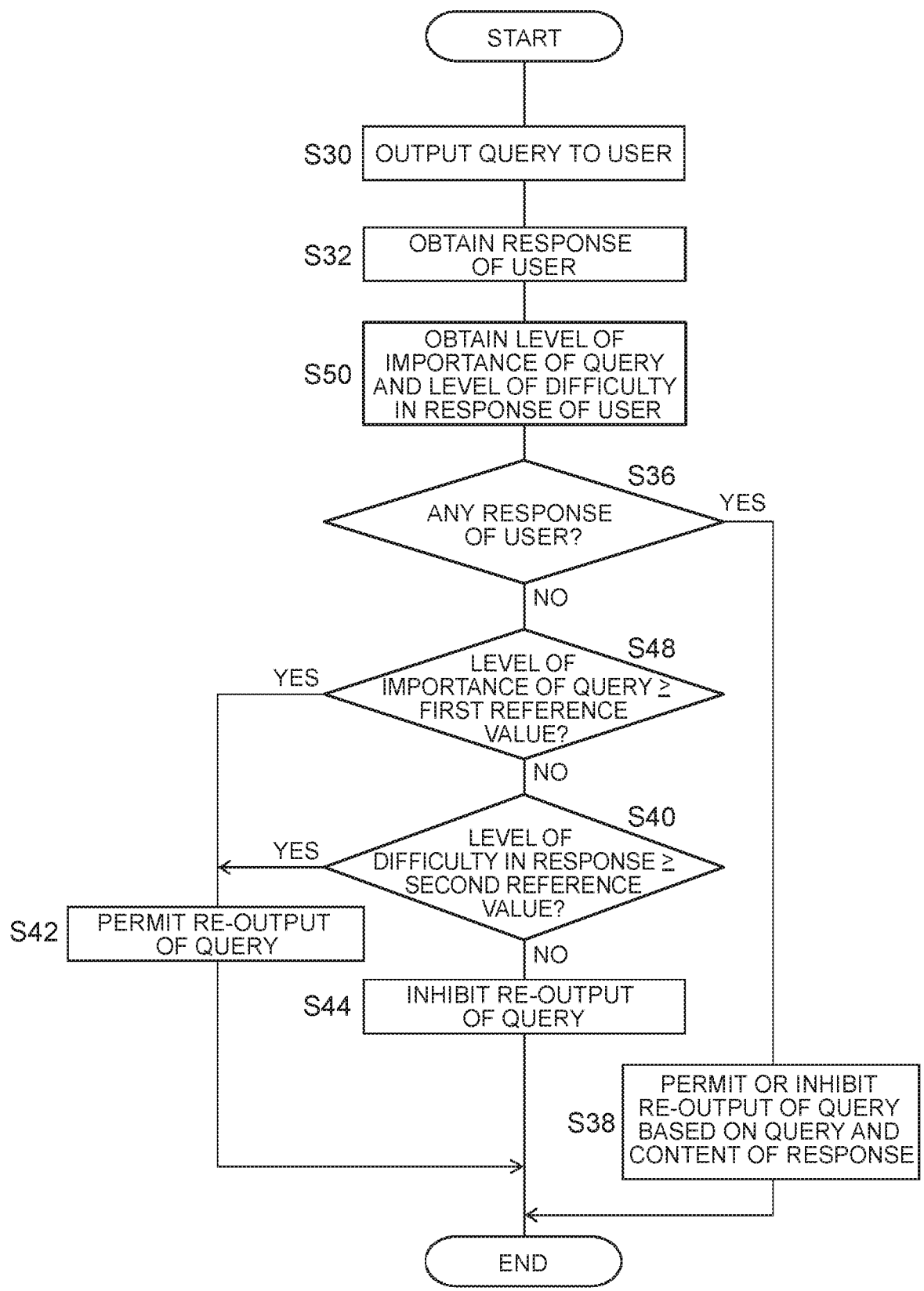
FIG. 9 is a flowchart illustrating a control routine of an information processor according to a fifth embodiment.

FIG. 9 is a flowchart illustrating a control routine of the information processor 10 according to the fifth embodiment. Steps S30, S32 are identical with those of FIG. 7. After execution of step S32, the second obtaining unit 50 obtains the level of importance of the query, and the level of difficulty in response of the user (step S50). The following steps S36, S38 are identical with those of FIG. 7. When there is no response of the user in step S36 (NO in step S36), step S42 that is identical with that of FIG. 7 is executed, if the level of importance of the query is equal to or higher than the first reference value (YES in step S48). When the level of importance of the query is not equal to nor higher than the first reference value (NO in step S48), and the level of difficulty in response is equal to or higher than the second reference value (YES in step S40), step S42 is executed. When the level of difficulty in response is not equal to nor higher than the second reference value (NO in step S40), step S44 that is identical with that of FIG. 7 is executed.

Sixth Embodiment

Generally, when the remaining quantity of any of articles of consumption, such as toilet paper, and food and drink, such as rice, which are always kept at home, is becoming small, the user purchases the article for refilling. However, the user may forget to purchase one, and purchase the article in haste after he/she runs out of it. It is recognized that, in a dialogue system, the convenience is enhanced by repeatedly providing reminders for purchase of an article of consumption, or the like, in timing suitable for the user.

Thus, in a sixth embodiment, the next output time of the reminder is determined, based on the content of a response of the user to the reminder. In the following, differences from the first embodiment will be mainly described.

Figure 10:
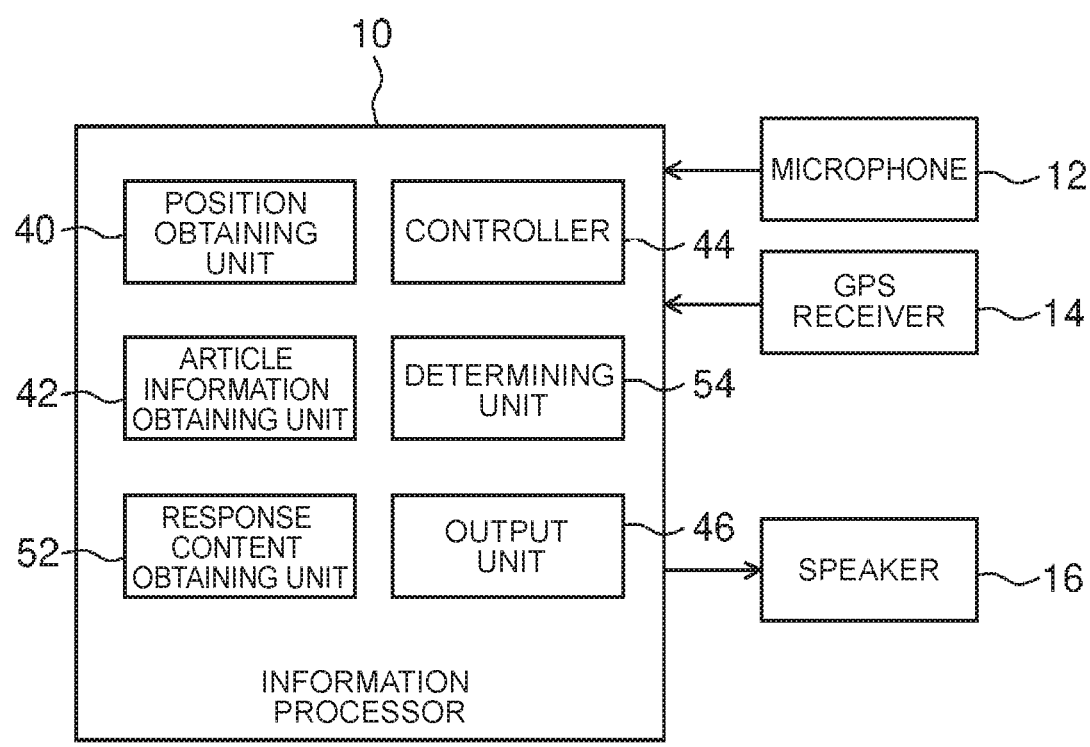
FIG. 10 is a block diagram showing the functional configuration of an information processing system according to a sixth embodiment.

FIG. 10 is a block diagram showing the functional configuration of an information processing system 1 according to a sixth embodiment. The configuration of an information processor 10 is different from that of the first embodiment. The information processor 10 includes the position obtaining unit 40, article information obtaining unit 42, response content obtaining unit 52, controller 44, determining unit 54, and output unit 46.

The user registers, in advance, a content of which he/she wishes to be reminded, namely, an article or articles to be purchased on a regular basis, and a store that sells each article, in the information processing system 1. The articles include articles of consumption and food and drink which are always kept at home as regular stock, for example.

The article information obtaining unit 42 obtains information on a certain article and a store that sells the article, based on the result of voice recognition, as in the first embodiment. The information on the article includes the name of the article.

For example, the user operates a button (not shown), and utters words, "Remember to buy toilet paper at the drugstore AA." With the utterance, the article information obtaining unit 42 obtains "toilet paper" as the name of the article, and obtains "drugstore AA" as the store that sells the article. The article information obtaining unit 42 supplies the obtained information to the controller 44.

When the information on the article, etc. is supplied from the article information obtaining unit 42 to the controller 44, the controller 44 supplies the content of a response, "I'll remember that," indicating that a reminder has been registered, to the output unit 46, and causes the output unit 46 to output the content of the response, as in the first embodiment.

When the controller 44 is supplied with the article information, etc., it creates a reminder, and supplies data of the reminder thus created, to the output unit 46. The reminder is concerned with availability of the article, and, more specifically, is used for checking if the remaining quantity of the article is sufficient. The reminder is in the form of text data, "Do you have enough XX (article name)?", for example.

When data of the reminder is supplied from the controller 44 to the output unit 46, the output unit 46 outputs the reminder thus supplied, via the speaker 16.

The response content obtaining unit 52 obtains the content of a response of the user to the reminder thus generated, based on the result of voice recognition. The response content is assumed to be "Yes" or "No", for example.

The determining unit 54 determines the next output time of the reminder from the output unit 46, based on the response content thus obtained. When the response content is "Yes" namely, when the response content indicates that there is a sufficient quantity of the article remaining, the determining unit 54 sets the next output time to a point later than the current time by a predetermined period. The predetermined period corresponds to the shortest reminding interval. The predetermined period is, for example, one week, and can be determined as appropriate by experiment, or the like. The predetermined period may be set for each article.

When the response content is "No", namely, when the response content indicates that the remaining quantity of the article is not sufficient, the determining unit 54 sets the next output time to a point later than the current time by a period from the actual output time of the previous reminder to which the content of the previous response indicates that the remaining quantity of the article is not sufficient, to the actual output time of the reminder immediately before the response concerned.

When the position of the user is within a predetermined distance from the store, after the next output time determined by the determining unit 54, the controller 44 supplies data of the reminder to the output unit 46, and causes the output unit 46 to output the reminder.

Figure 11:
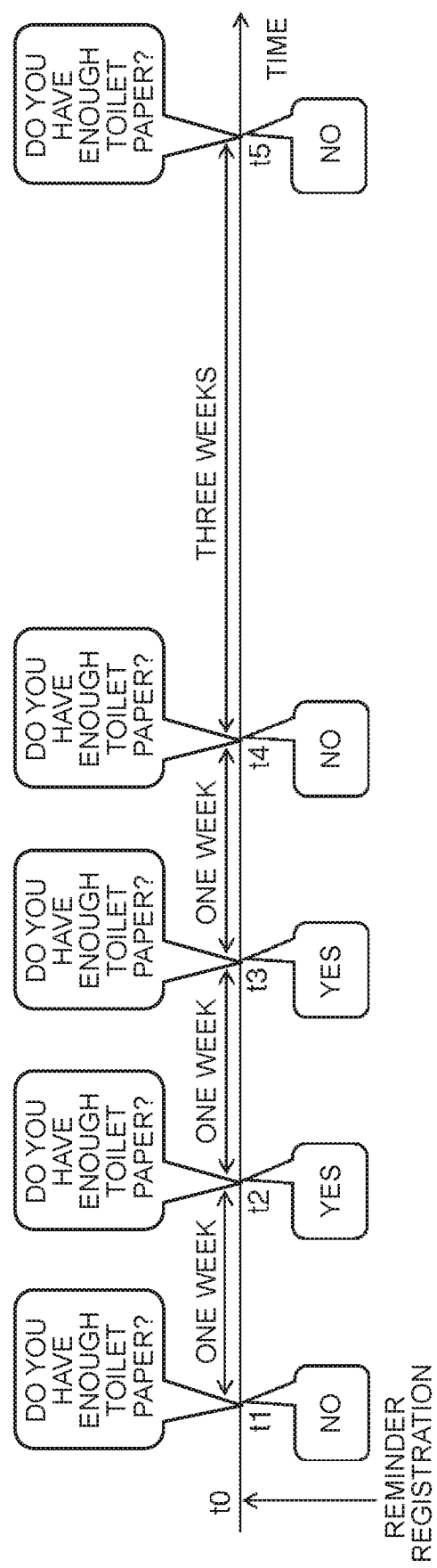
FIG. 11 is a view useful for describing the timing of reminding in the information processing system of FIG. 10.

FIG. 11 is useful for describing the timing of generation of reminders in the information processing system 1 of FIG. 10. Here, it is assumed that the user is in the vicinity of the store at the output time of each reminder. For example, after a reminder for toilet paper is registered at time t0, the first reminder, "Do you have enough toilet paper?", is generated at time t. When the user's response to the reminder is "No", the output time of the next reminder is determined to be one week as the shortest period later. When the user's response to another reminder at time t2 that is one week later than t1 is "Yes", the next output time is determined to be one week later. When the user's response to another reminder at time t3 that is one week later than t2 is "Yes", the next output time is determined to be one week later. When the user's response to another reminder at time t4 that is one week later than 3 is "No", the next output time is determined to be three weeks later, since the interval from the last reminder to which the response was "No" to the reminder to which the response is "No" this time is three weeks. It is assumed that the user purchased toilet paper immediately after the time when the user gave the response. "No", last time, and the remaining quantity of toilet paper became insufficient three weeks later. It may be appropriate to remind this user of purchase of toilet paper for every three weeks. The user is highly likely to give the response, "No", to a reminder at time t5 that is three weeks later than time t4; in this case, the next output time is kept being three weeks later. It may be said that the determining unit 54 learns the interval of reminding, based on the content of the user's response.

On the other hand, when the user gives the response "Yes" to the reminder generated at time t5 that is three weeks later than time t4, the next output time is determined to be one week later. When the user gives the response "No" to a reminder generated one week later, the next output time is determined to be four weeks later. Thus, the next output time can be adjusted to be further later.

Figure 12:
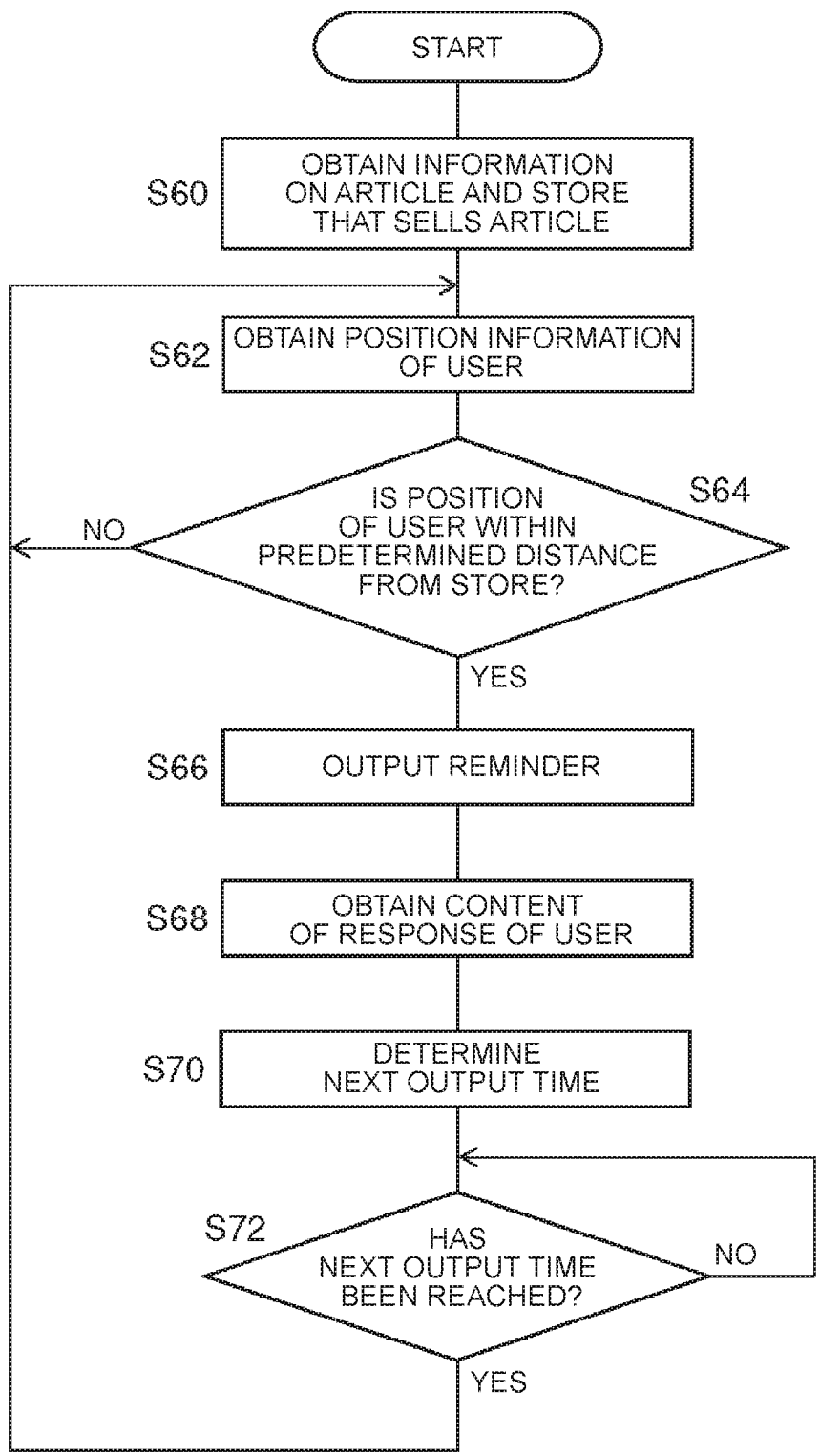
FIG. 12 is a flowchart illustrating a control routine of an information processor of FIG. 10.

Next, the overall operation of the information processing system 1 configured as described above will be described. FIG. 12 is a flowchart illustrating a control routine of the information processor 10 of FIG. 10. The control routine of FIG. 12 is executed when the user performs button operation for reminder registration.

The article information obtaining unit 42 obtains information on the article and the store that sells the article (step S60), and the position obtaining unit 40 obtains position information of the user (step S62). When the position of the user is not within the predetermined distance from the store (NO in step S64), the control returns to step S62. When the position of the user is within the predetermined distance from the store (YES in step S64), the output unit 46 outputs a reminder (step S66), and the response content obtaining unit 52 obtains the content of a response of the user (step S68). The determining unit 54 determines the next output time of the reminder (step S70). When the next output time has not been reached (NO in step S72), the control returns to step S72. When the next output time has come (YES in step S72), the control returns to step S62.

According to this embodiment, the next output time of the reminder is determined based on the content of the user's response to the reminder, so that the user can be repeatedly reminded in timing suitable for the user.

For example, even where the user visits the drugstore AA once a week, the user is not reminded each time, but can be reminded at times when there is a possibility that the remaining quantity of toilet paper at home is becoming small. It is thus possible to remind the user in appropriate timing, while making it less likely or unlikely to have the user bothered by unnecessary reminders. Thus, the user need not check and remember the period from purchase of the article to the time when the user runs out of the article, which is convenient to the user.

In this connection, the article information obtaining unit 42 may obtain information on two or more articles, and a store that sells each article. In this case, the output unit 46 outputs a reminder for each of the two or more articles. The determining unit 54 determines the next output time of the reminder based on the content of the response obtained, for each article. Thus, the user can be repeatedly reminded in timing suitable for the user, with respect to each of the two or more articles.

Also, the output unit 46 may output the reminder when the ignition switch of the vehicle is turned on, if it is after the next output time, no matter whether the position of the user is within the predetermined distance from the store. In this case, the user can be reminded even when the user is not in the vicinity of the store. Thus, the user can be appropriately reminded of purchase of an article that is purchased at a store which the user does not visit very often.

Suppose the user has made an additional purchase of an article at the time when he/she received the reminder, and therefore, the user repeatedly gave the response, "Yes", to the reminder a dozen of times or more. In this case, when the user gives the response, "No", after that, the next output time is determined to be a dozen of weeks or more later, which is not realistic. Thus, when the next output time is beyond a predetermined time, the determining unit 54 may determine the next output time to be the output time determined immediately before the output time after a predetermined period is excluded. The predetermined time may be five weeks later, for example, and can be determined as appropriate by experiment, or the like. The predetermined time may be set for each article. Thus, the output time that is not realistic can be excluded.

The disclosure has been described based on the embodiments. It is to be understood by those skilled in the art that the embodiments are merely exemplary, various modified examples can be provided from combinations of constituent elements or process steps in the embodiments, and that these modified examples are also within the scope of the disclosure.

While one example in which the information processing system 1 is installed on the vehicle has been described, the information processing system 1 may be in the form of a portable terminal, such as a smartphone, carried by the user.

What is claimed is:

1. An information processing method executed by an information processor in a vehicle, the information processing method comprising:
    registering, based on an input by a user, article information on an article that the user wishes to purchase;
    obtaining a category of the article by referring to a database in which the article is associated with the category of the article;
    outputting, as a dialogue sound through a speaker, a reminder concerning a purchase of the article to the user in response to satisfying a reminding condition based on the article information;
    determining a level of difficulty for the user to respond to the reminder, the level of difficulty being based on at least one of vehicle information or user information that is detected by a sensor installed in the vehicle; and
    in response to detecting that the level of difficulty exceeds a threshold, outputting the reminder again.

2. The information processing method according to claim 1, outputting, as the dialogue sound through the speaker, the reminder concerning the purchase of the article to the user in response to satisfying the reminding condition based on the article information during a reminding period from a timing of registering the article information, the reminding period being set according to the category of the article.

3. The information processing method according to claim 2, further comprising obtaining information on a position of the user, wherein:
    the article information includes information on a store that sells the article;
    the reminding condition includes a condition that the position of the user is within a predetermined distance from the store; and
    the reminder is not output even when the reminding condition is satisfied again during the reminding period in a case where the position of the user is within the predetermined distance from the store, for a predetermined time.

4. An information processor of a vehicle comprising circuitry configured to:
    register, based on an input by a user, article information on an article that the user wishes to purchase;
    obtain a category of the article by referring to a database in which the article is associated with the category of the article;
    output, as a dialogue sound through a speaker, a reminder concerning a purchase of the article to the user in response to satisfying a reminding condition based on the article information;
    determine a level of difficulty for the user to respond to the reminder, the level of difficulty being based on at least one of vehicle information or user information that is detected by a sensor installed in the vehicle; and
    in response to detecting that the level of difficulty exceeds a threshold, output the reminder again.

5. The information processing method according to claim 1, wherein the sensor detects at least one of a traveling state of the vehicle, an image of the user, and an in-cabin state of the vehicle.

6. The information processor according to claim 4, wherein the sensor detects at least one of a traveling state of the vehicle, and an image of the user, and an in-cabin state of the vehicle.

7. The information processing method according to claim 2, wherein the reminder is not output when the reminding period has passed.

* * * * *